United States Patent
Haack

[11] Patent Number: 6,015,178
[45] Date of Patent: Jan. 18, 2000

[54] TRUCK BED LINER WITH HINGEDLY AFFIXED DIVIDER

[76] Inventor: Brian Haack, 2050 Haslett Rd., Haslett, Mich. 48840

[21] Appl. No.: 08/870,334

[22] Filed: Jun. 6, 1997

[51] Int. Cl.[7] .................................................. B60R 13/01
[52] U.S. Cl. ............................................................ 296/39.2
[58] Field of Search ........................................... 296/39.2

[56] References Cited

U.S. PATENT DOCUMENTS

| 4,693,507 | 9/1987 | Dresen et al. | 296/39 R |
|---|---|---|---|
| 4,733,899 | 3/1988 | Keys | 296/24 R |
| 4,875,730 | 10/1989 | Justice | 296/37.5 |
| 4,958,876 | 9/1990 | Diaco et al. | |
| 5,044,682 | 9/1991 | Wayne | 296/39.2 |
| 5,167,434 | 12/1992 | Bott | 296/39.2 |
| 5,265,993 | 11/1993 | Wayne | 410/129 |
| 5,415,506 | 5/1995 | Payne | 410/129 |
| 5,456,514 | 10/1995 | Justice | 296/39.2 |

FOREIGN PATENT DOCUMENTS

| 62-12478 | 1/1987 | Japan . |
|---|---|---|
| 2127141 | 5/1990 | Japan . |

*Primary Examiner*—Gary C. Hoge
*Attorney, Agent, or Firm*—Knechtel, Demeur & Samlan

[57] ABSTRACT

The present invention is a truck bed liner having two side walls, a front wall, a bottom, and a rear wall, the bottom further having an integrated liner incorporated into it. The divider is formed by either molding or cutting slots on three sides of the liner bottom. The fourth side is molded or cut into a living hinge. The living hinge allows the unattached portion of the truck bed liner bottom to move freely about the hinge. The side walls of the truck bed liner include receiving channels into which the hinged dividers are locked into place. A latch is molded into and extends from the lower aspect of each sidewall at a point in which when the divider is placed into its horizontal position, will hold it in place. In operation, an operator can position the hinged divider to a 90° position with respect to the bottom and lock it into the receiving channels found on the side walls. Once locked into position, a compartment is created on each side of the raised wall. When compartmentalization is no longer needed, the hinged portion of the liner can be removed from the side wall channels and placed into a horizontal position, being locked into position by the latches.

19 Claims, 6 Drawing Sheets

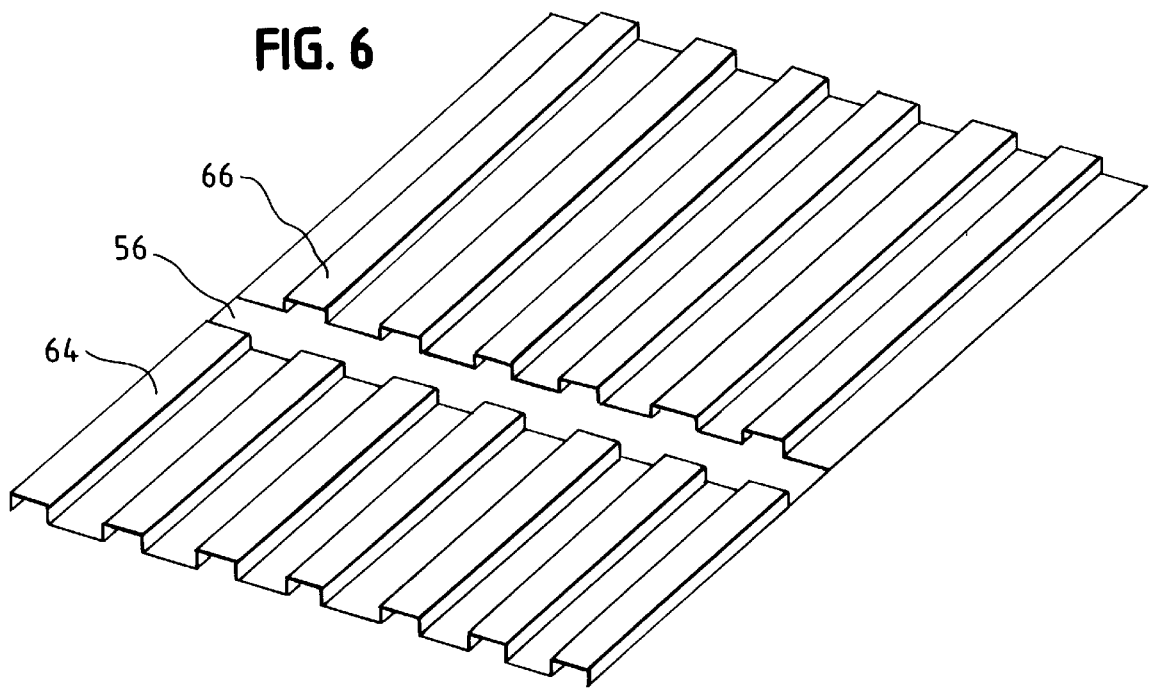
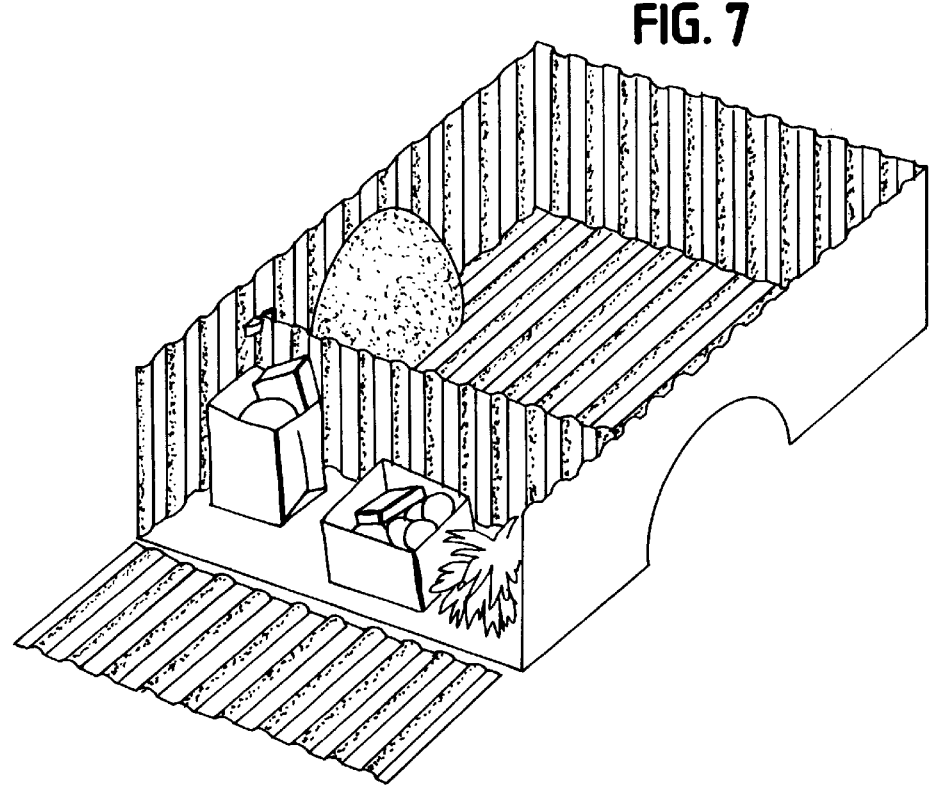

TRUCK BED LINER WITH HINGEDLY AFFIXED DIVIDER

I. FIELD OF THE INVENTION

This invention relates to Truck Bed Liners and more particularly to a Truck Bed Liner having an integrated divider which permits compartmentalization of the Truck Bed.

II. BACKGROUND OF THE INVENTION AND PRIOR ART

Liners are used to protect the interior surfaces of pickup truck beds. They prevent or minimize scratching and denting of the bed, thereby helping to maintain a truck's looks and increasing truck resale value. Liners typically cover the entire bed of the truck, with a separate section affixed to the interior surface of the tail gate. Bed liners are usually made from vacuum formed plastic which is molded to fit the contours of a truck bed. Most liners also have multiple corrugations found throughout the liner surface. The corrugations serve multiple purposes including water drainage, structural strength, and, perhaps most importantly, provide an additional cushion between the liner and the truck bed. Examples of truck bed liners are seen in U.S. Pat. No. 4,693,507 to Dresen et al., Japanese Patent No. 62-12478 (A) to Mitsuo, and Japanese Patent No. 2-127141(A) to Jungi.

While truck bed liners offer adequate protection to the truck bed itself, items stored in liners are free to slide around, thereby increasing the risk of damage to those items and, during sudden stops, turning the items into projectiles which can cause injury. Over the years, attempts have been made to create dividers which compartmentalize truck beds. Items can then be stored in a compartmentalized section of the truck bed, thereby decreasing the risk of injury to items stored in the bed and to persons who might be injured by flying objects. Solutions have generally relied upon a separate divider unit inserted at a predetermined point in the bed.

An example of a separate divider system for truck bed liners is seen in U.S. Pat. No. 5,167,434 to Bott. This patent teaches a truck bed liner having recessed members molded into its sidewalls, the recessed members being capable of accepting wood or other divider materials within them. By sliding a separate piece of wood or other material into the recessed members, the truck bed liner is compartmentalized.

A similar type device is seen in U.S. Pat. No. 5,415,506 to Payne. This patent teaches of recesses being molded into the truck bed itself at predetermined points. The recesses, like in the Bott patent, accept wood or other divider material within their channels.

Further examples of divider systems for pickup beds which utilize separate dividers are seen in U.S. Pat. Nos. 5,265,993 and 5,044,642, both to Wayne. These patents teach divider systems being placed into the bed of a pickup truck. Both patents rely upon a receiving bracket being fixed to the sidewall of a pickup truck bed. Dividers are then slid into the receiving brackets.

A final example of a separate divider for pickup truck beds is seen in U.S. Pat. No. 4,733,899 to Keys. This device teaches a portable divider comprised of a flat support plate that extends across the bed of a truck and abuts against the wheel well of the truck.

A shortcoming of all these devices is that they require separate divider panels be carried within the bed of the pickup truck at all times. If the divider panels are not in the bed of the pickup truck, the truck bed cannot be compartmentalized. Conversely, having to carry around separate divider panels at all times may be inconvenient for a user when attempting to carry large items for which no compartmentalizing of the truck bed is required. Furthermore, transporting the divider panels within the truck bed may create a hazard inasmuch as unless they are tied down, they are free to move about the bed of the pickup truck.

An example of a truck bed load organizer in which the panels are in a horizontal fixed position in the bed of the truck when not use is seen in U.S. Pat. No. 4,875,730 to Justice. This patent teaches a plurality of cutouts made into a base piece which lays horizontally on a pickup bed floor. Panels, corresponding in size and shape to the cutouts, are placed into the cutouts, and a hinge having a hinge pin is used to connect the panels to the base. The manufacturing of this product is complex, making it cost prohibitive for many individuals.

A final example is seen in U.S. Pat. No. 5,456,514, also to Justice. This patent teaches a base piece made of a flat belting material into which three sided cutouts are made. The cutouts can be lifted along their free ends to create truck bed compartments. Items stored within the compartments provide the tension to keep the cutouts in place. Once the stored items are removed, the cutouts return to their flat position. A shortcoming of this device is that since the stored items provide the tension to keep the cutouts in place, this device is difficult to work with when an individual is trying to move items about the bed of the truck. Also, since the natural tendency of the cutouts is to move back into their natural flat state, the oppositional pressure provided by the cutout material against the stored item may crush the stored items. Finally, over time, belting material has a tendency to weaken. Therefore, through extensive use the cutouts will not return to their original positions, causing a lip upon which items may snag.

There is, therefore, need for economical, easy to use, long lasting integrated divider system for truck beds.

II. SUMMARY OF THE INVENTION

The instant invention is a truck bed liner having at least one integrated divider. According to the invention, a truck bed liner having two side walls, a front wall, a bottom, and a rear wall is utilized. The rear wall is generally a separate piece affixed to a tail gate or hatch but may also be integrated to the remainder of the liner. The bottom of the truck bed liner is co-formed to the front of the truck bed liner. The liner bottom is also co-formed to the liner side walls. At predetermined locations in the liner bottom are found divider panels. The panels are formed by either molding or cutting slots on three sides of the liner bottom. The fourth side is molded or cut into a living hinge. The living hinge allows the unattached portion of the truck bed liner bottom to move freely about the hinge. The side walls of the truck bed liner include receiving channels into which the hinged dividers are locked into place. A latch is molded into and extending from the lower aspect of the sidewalls at a point in which when the divider is placed into its original position, will hold it in place.

In operation, an operator can position the hinged divider to a 90° position with respect to the bottom and lock it into the receiving channels found on the side walls. Once locked into position, a compartment is created on each side of the raised wall. When compartmentalization is no longer needed, the hinged portion of the liner can be removed from the side wall slots and placed into a flat position, being locked into position by the latches.

It is, therefore, an object of the present invention to create a Truck Bed Liner having an integrated compartmentalization feature comprising at least one divider molded or cut into the liner bottom on three sides and having a living hinge on its fourth side.

It is another object of the present invention to create a Truck Bed Liner having locking means to hold the dividers in place when positioned at 90° from horizontal and additional locking means to hold the dividers in a horizontal position when compartments are not required.

It is a further object of the present invention to provide a truck with an integrated compartmentalization feature which is economical to produce.

IV. BRIEF DESCRIPTION OF THE DRAWINGS

FIG. 6 depicts an alternate embodiment illustrating the offset molding feature wherein a squared molding pattern is utilized.

FIG. 7 depicts the inventive device wherein the hinged divider is in a 90° locked position off the vertical axis illustrating the storage of items in the compartment.

V. DESCRIPTION OF THE PREFERRED EMBODIMENT

The description of the preferred embodiment is directed to pickup truck bed liners. It should be understood, however, that the principles of the inventive device can just as easily be adapted to liners for use in sport utility vehicles, station wagons, passenger motor vehicle trunks and the like.

Figure 1:
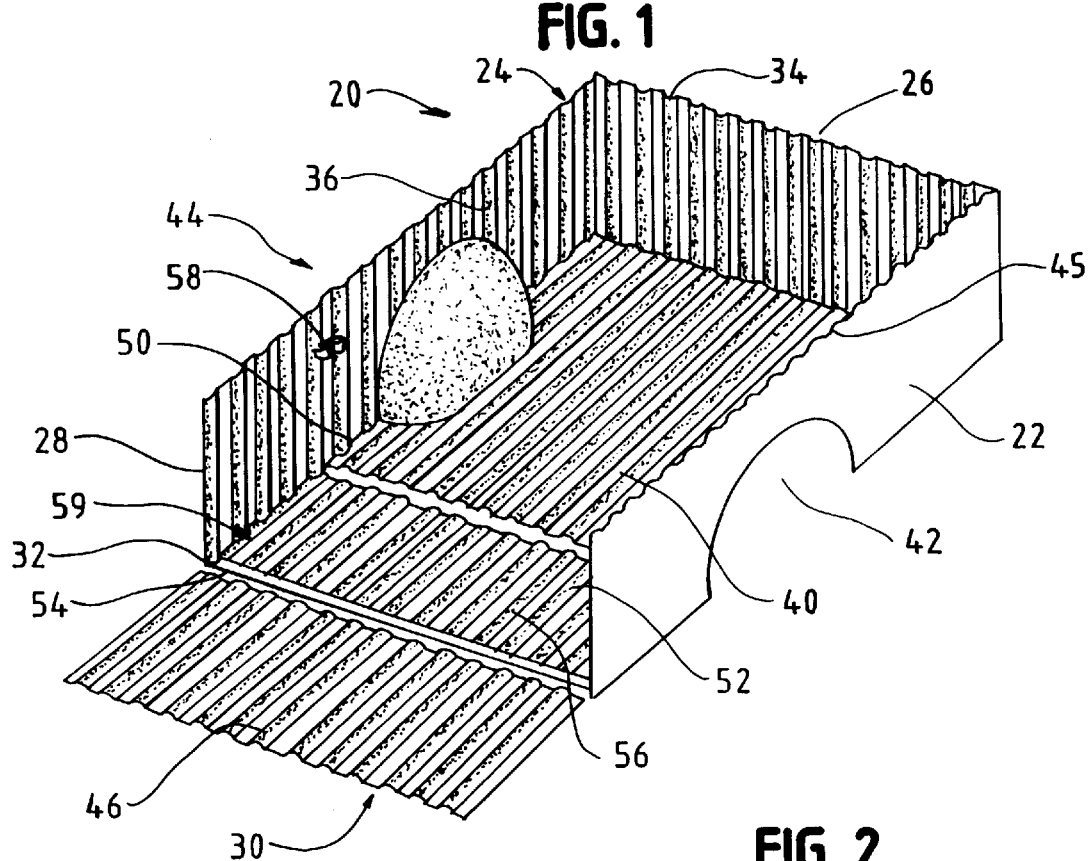
FIG. 1 depicts the inventive device illustrating the hinged divider in a flat position along the horizontal axis.

Referring to FIG. 1, a truck bed liner 20 having a liner front wall 34, liner side walls 36, 38, a liner bottom 40, and a tail gate liner section 46 is depicted. Liner 20 is preferably made of a lightweight, flexible semi-ridged material such as Acrylonitrile-Butadiene-Styrene ("ABS") plastic; however, any of the commonly used plastic materials may be utilized. Truck bed liners are typically molded through a thermal form process. This process works for the present invention as well. The truck bed liner is molded to fit the contours of a truck bed, including wheel well shrouds 42. A separate tail gate liner section 46 is molded and attached to tail gate 30. Alternatively, tail gate liner section 46 may be molded directly to liner 20.

Liner bottom 40 is co-formed to liner front wall 34 at 48. Liner bottom 40 is co-formed to liner side walls 36, 38 at 50 beginning at a point near liner front wall 34 to a first predetermined point on the side walls 36, 38. At the first predetermined point is found living hinge 52. Living hinge 52 extends from liner side wall 36 to opposite liner side wall 38. Liner bottom 40 extends to the rear of a living hinge 52 to a second predetermined point 53. Between living hinge 52 and second predetermined point 53, liner bottom 40 is not attached to liner side walls 36, 38. At second predetermined point 53 is found free edge 54. Free edge 54 extends from liner side wall 36 to liner side wall 38. Free edge 54 has a horizontal rib 55 along its edge. Horizontal rib 55 provides strength to the divider. The essentially "U" shaped unattached portion of liner bottom 40 comprises divider 56.

Figure 2:
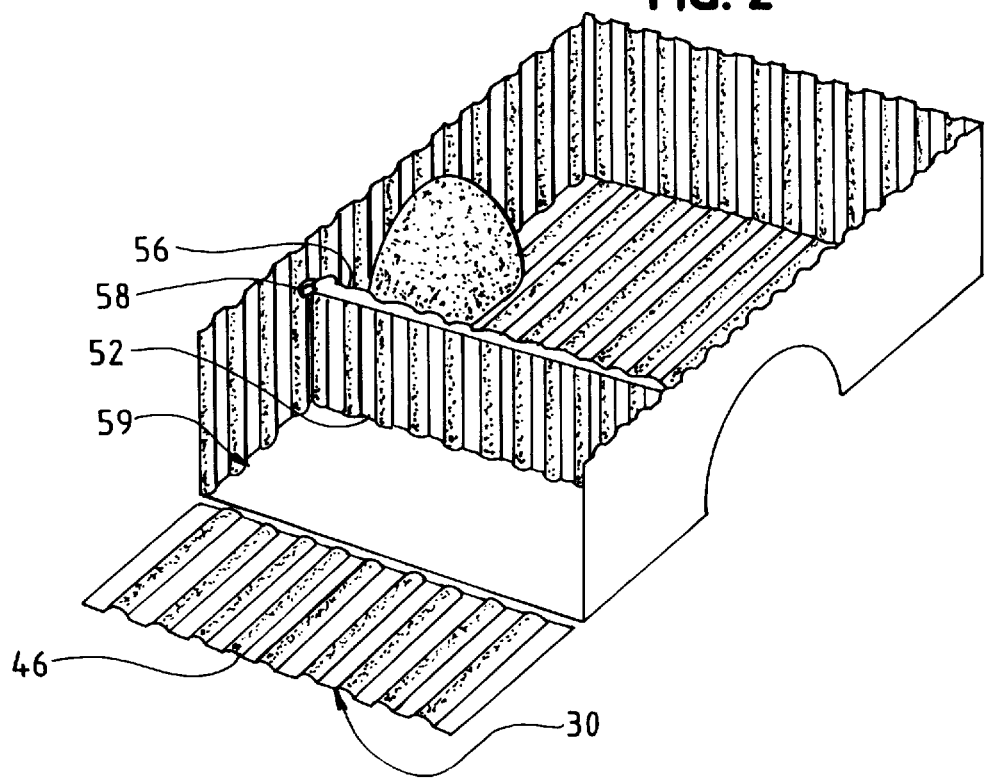
FIG. 2 depicts the hinged divider locked into position at 90° from horizontal.
Figure 3:
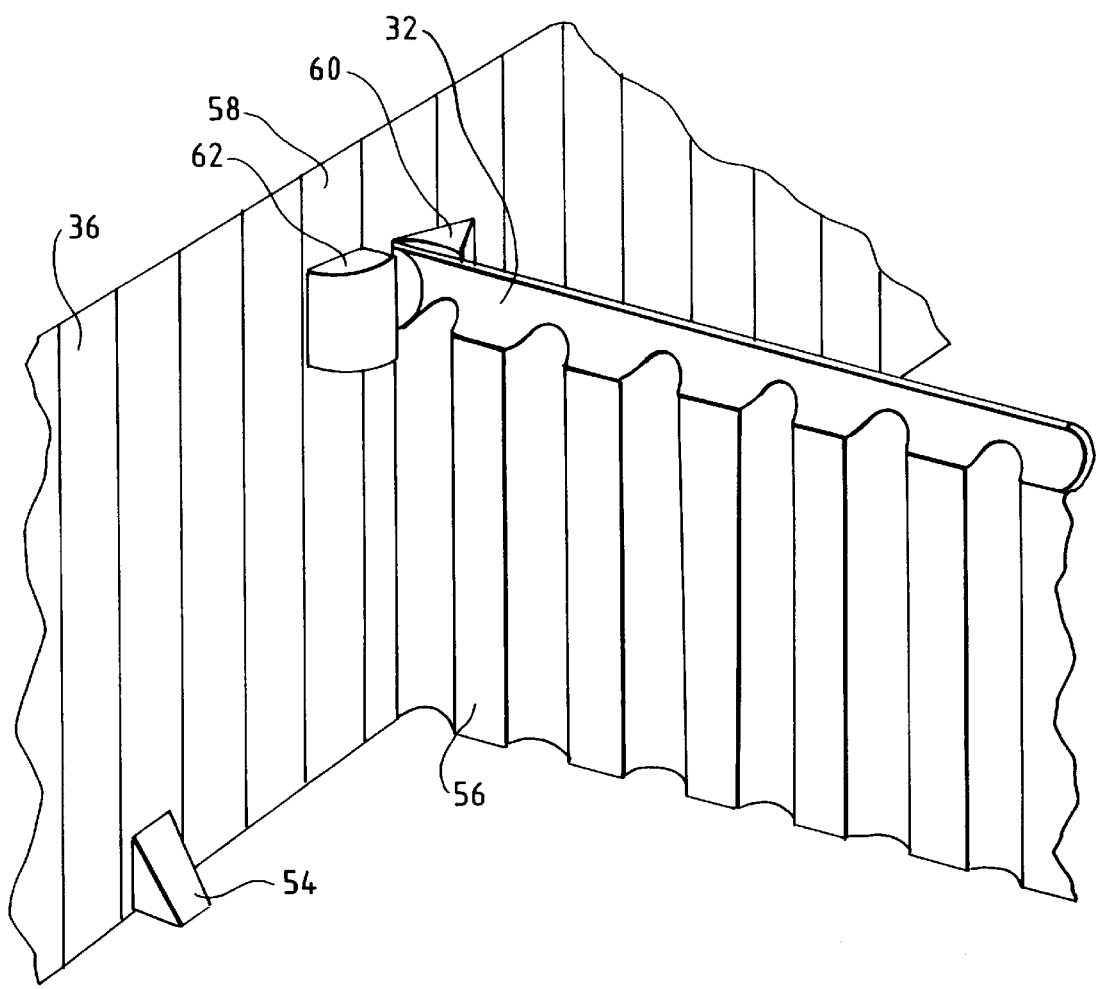
FIG. 3 shows a fractionalized view of a hinged divider in a 90° raised position illustrating the locking mechanism.
Figure 4:
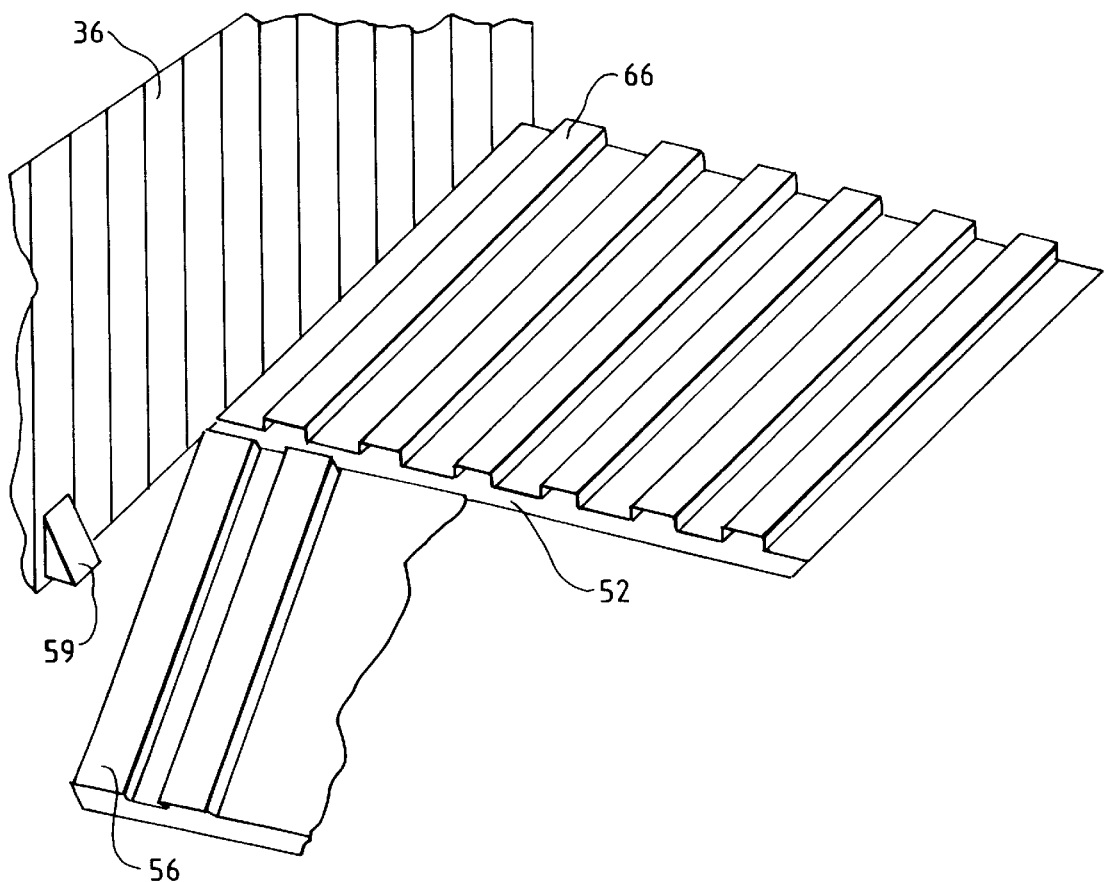
FIG. 4 is a fractionalized view illustrating an exaggerated view of a divider pushed past the lower latch means.

Turning to FIG. 2 it can be seen that divider 56 can be raised to 90° off horizontal along living hinge 52 where it is then locked into place using divider vertical lock means 58. Turning to FIG. 3, it can be seen that vertical divider lock means 58 consists of front lock portion 60 and rear lock portion 62. Front lock portion 60 and rear lock portion 62 protrude from liner side walls 36, 38 to a point sufficient to maintain divider 56 securely in place. Front lock portion 60 and rear lock portion 62 are spaced apart from one another sufficient distance to accept divider 56 and hold in rigidly in place. Divider 56 is placed into divider vertical lock means 58 by "snapping" it into place. To remove divider 56 from divider vertical lock means 58, pressure is applied to a point along divider 56 at horizontal rib 55 such that bowing of divider 56 occurs, thereby allowing divider 56 to be removed from divider vertical lock means 58. When placed into its horizontal storage position, divider 56 is secured into place by lower latch means 59. As seen in FIG. 4, lower latch means 59 protrudes from each side wall near the lower aspect of each side wall.

In an alternate embodiment, there are multiple integrated dividers. Each divider has a living hinge, unattached sides and a free edge extending from side wall to side wall. Two divider vertical lock means and two latches are associated with each divider. The only factor limiting the number of dividers is the structural integrity of the liner. The greater the number of dividers, the fewer solid attachments between the liner sides and the liner bottom. This can decrease the strength of the liner.

Figure 8:
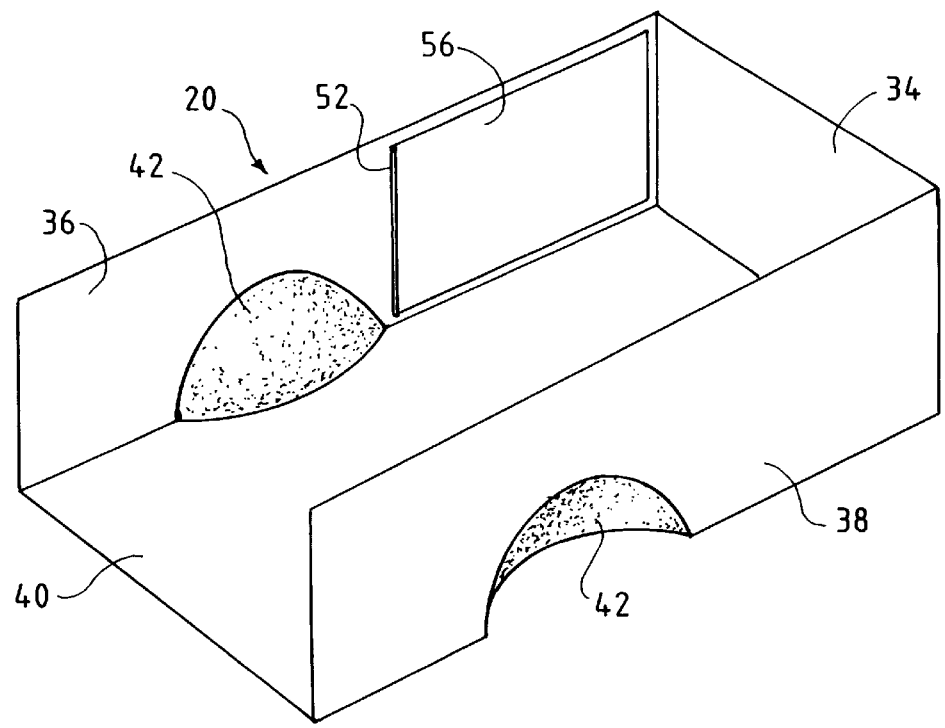
FIG. 8 depicts a side perspective view of an alternative embodiment of the inventive device wherein a divider is located in a liner sidewall, the divider depicted in a non-use position.
Figure 9:
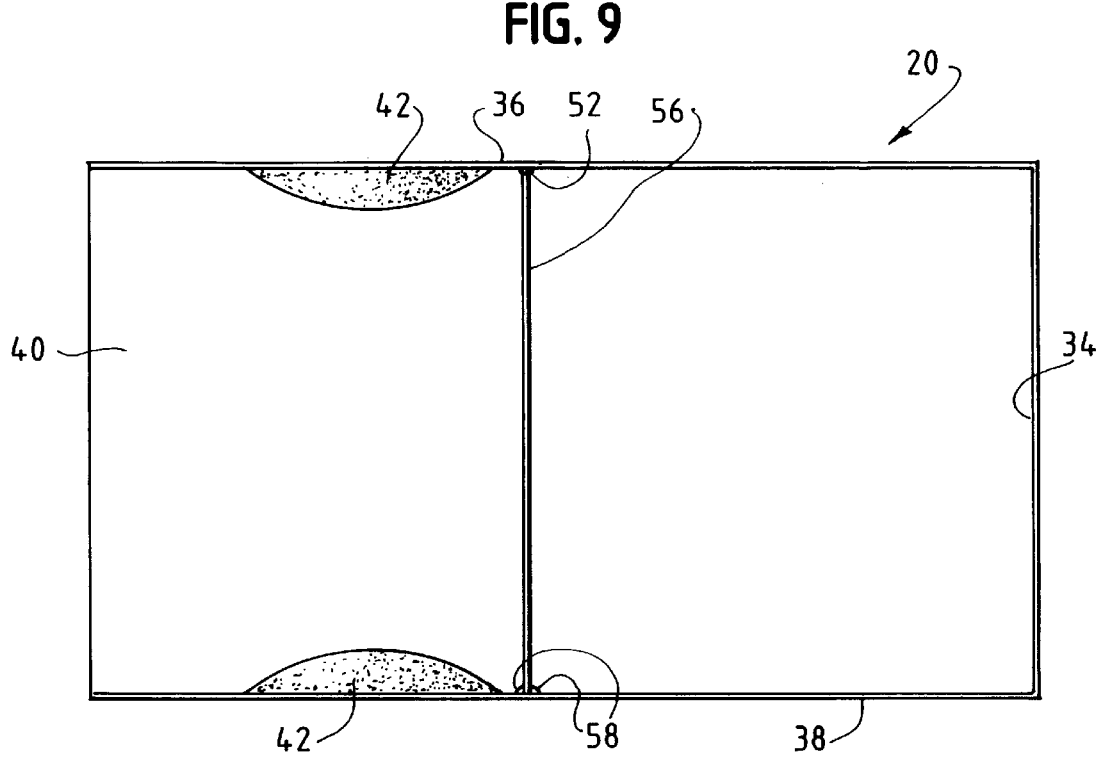
FIG. 9 depicts a top view of an alternative embodiment of the inventive device wherein a divider is located in a liner sidewall, the divider depicted an in-use position.

As shown in FIGS. 8 and 9, the dividers 56 may also be molded or cut into the side walls 36 of the liner 20. In this embodiment the dividers are formed into one wall are then pivoted about a living hinge 52 on the vertical axis and secured into place by a divider lock means 58 found on the opposite sidewall 38. The disadvantage of this embodiment is that the side wall surface available to mold or cut a divider may not be sufficient to completely compartmentalize the bed.

FIG. 7 depicts a representative of an example of items stored in the compartment created when divider 56 is in a raised position and locked into position and by divider lock means 58.

Figure 5:
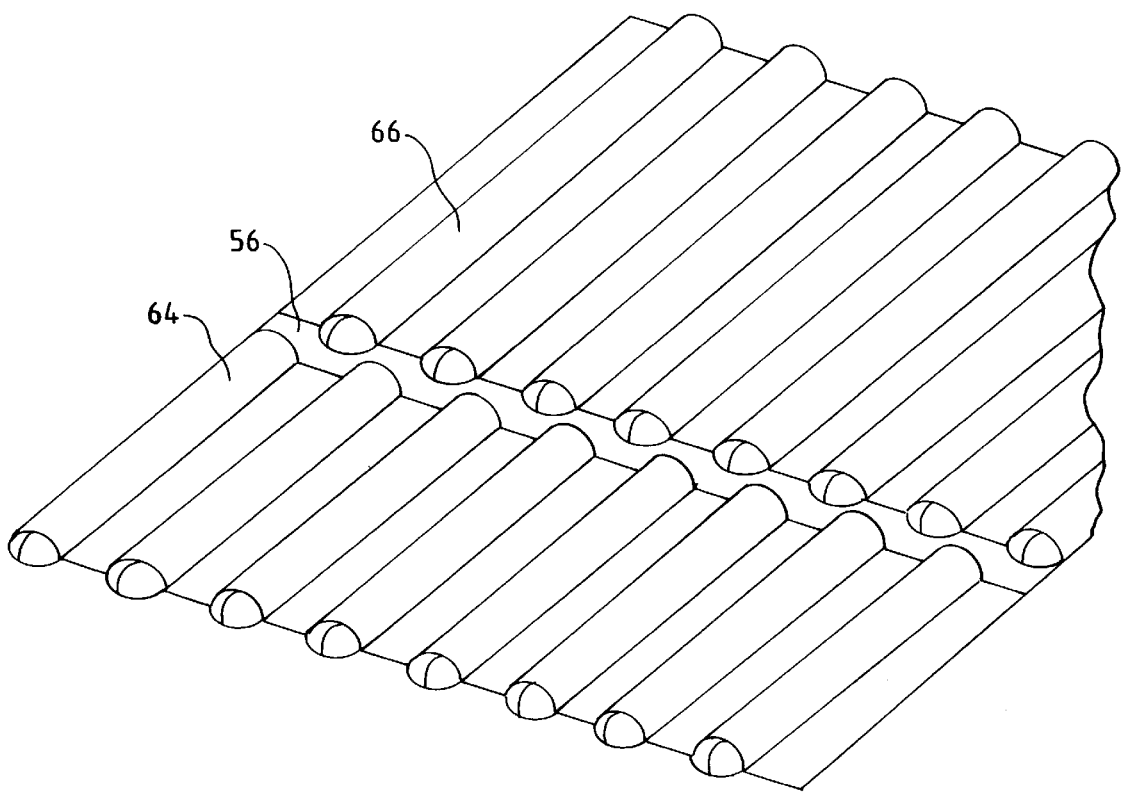
FIG. 5 is a fractionalized view illustrating the offset molding features of the device in a rounded corrugated pattern.

FIG. 5 and 6 are alternate examples of molding techniques used in manufacturing truck bed liner 32. FIG. 5 depicts a rounded molding process while FIG. 6 depicts a squared molding process. It should be noted that in both FIG. 5 and FIG. 6, the corrugations 64 of the divider are offset to the corrugations 66 of the remainder of truck bed liner bottom 40. This is critical to the operation of the device inasmuch when divider 56 is raised from its vertical position to its horizontal position, the corrugations of the divider fit between the corrugations of the remainder of the liner bottom. If the corrugations of the divider and remainder of the liner bottom were not offset, they would crush into one another making it difficult to raise the divider into position without damaging the divider. While the preferred embodiment of the inventive device contemplates an offset molding process, cutouts enabling the divider to raised up and over the corrugations of the remainder of the liner bottom are also contemplated. Of course, liners not using raised corrugations, have no need for offsetting the divider corrugations and the remainder of the liner bottom.

The above description of the preferred embodiment is for illustration purposes only and not meant to be a limiting features. As those skilled in the arts will quickly understand there are variations of the inventive device which may be implemented without circumventing the scope and spirit of the invention herein. The scope of the inventive device is to be determined by interpretation of the appended claims only.

I claim:

1. A truck bed liner of the type generally having a front wall, two side walls, a bottom, and a back wall which is an integral part of the liner or, alternatively, a separate piece affixed to a tailgate, the improvement comprising:

a divider hingedly affixed to the liner; and divider securing means, whereby, the integrated divider can be positioned and secured with the divider securing means to compartmentalize the truck bed.

2. The truck bed liner of claim 1 wherein the integrated divider is located in the bottom of the truck bed liner.

3. The truck bed liner of claim 1, wherein the integrated divider is molded into the truck liner and has three free edges and a fourth edge comprising a hinge means to fix the divider to the liner.

4. The truck bed liner claim 3, wherein the hinge means further comprises a living hinge.

5. The truck bed liner of claim 1 wherein the integrated divider is cut into the liner after the liner is manufactured.

6. The truck bed liner of claim 5, wherein the integrated divider is cut into the truck liner bottom and has three free edges and a fourth edge comprising a hinge means to fix the divider to the liner.

7. The truck bed liner of claim 1 wherein the divider securing means further comprises at least two protrusions extending outwardly from each side wall of the liner at a predetermined point in the side walls such that they maintain the divider in a 90° angle when the divider is in a raised position, said protrusions being spaced apart from one another along the horizontal axis a sufficient distance such that the divider can be positioned between them.

8. The truck bed liner of claim 1 further comprising horizontally divided locking means to maintain the divider in a horizontal position when the divider is not in a raised position.

9. The truck bed liner of claim 1 wherein the integrated divider is molded into one sidewall of the liner.

10. The truck bed liner of claim 1 wherein the integrated divider is cut into one of the liner side walls after the liner.

11. A truck bed liner of the type generally having a front wall, two side walls, a bottom, and a back wall which is an integral part of the liner or, alternatively, a separate piece affixed to a tailgate, the improvement comprising:

at least one divider hingedly affixed to the liner; and divider securing means corresponding in number to the number of integrated dividers, whereby, at least one integrated divider can be positioned and secured with the corresponding divider securing means thereby compartmentalizing the truck bed.

12. The truck bed liner of claim 11 wherein at least one integrated divider is located in the bottom of the truck bed liner.

13. The truck bed liner of claim 11, wherein the at least one integrated divider is molded into the truck liner bottom and further has three free edges and a fourth edge having a hinge means to fix the integrated divider to the liner.

14. The truck bed liner of claim 13, wherein the hinge means further comprises a living hinge.

15. The truck bed liner of claim 11, where the at least one integrated divider is cut into the bottom of the liner after the liner is manufactured.

16. The truck bed liner of claim 11 wherein the divider securing means further comprise at least two protrusions extending outwardly from each side wall of the liner, said protrusions being based apart from one another along the horizontal axis, a sufficient distance such that the hingedly affixed dividers can be positioned between them and located at a point in the side walls adjacent to the living hinge corresponding to a divider.

17. The improved liner of claim 11 further comprising horizontal divider locking means corresponding in number to the number of integrated dividers.

18. At least one integrated divider of claim 11 wherein the divider is molded into one side wall of the liner.

19. The improved liner of claim 11 wherein at least one integrated dividers are cut into one of the liner side walls after the liner is manufactured.

* * * * *